United States Patent
Ridgway et al.

(10) Patent No.: US 8,627,742 B2
(45) Date of Patent: Jan. 14, 2014

(54) STEERING COLUMN ASSEMBLY WITH SHEARABLE JACKET CONNECTOR

(75) Inventors: Jason R. Ridgway, Bay City, MI (US); Albert C. Huber, Montrose, MI (US); Robert D. Maida, Pinconning, MI (US); Scott A. Stinebring, Auburn, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 1229 days.

(21) Appl. No.: 12/201,439

(22) Filed: Aug. 29, 2008

(65) Prior Publication Data

US 2009/0249916 A1    Oct. 8, 2009

Related U.S. Application Data

(60) Provisional application No. 61/072,994, filed on Apr. 4, 2008.

(51) Int. Cl.
*B62D 1/19*    (2006.01)

(52) U.S. Cl.
USPC ............................................ 74/493; 280/777

(58) Field of Classification Search
USPC ................. 74/492, 493; 280/775, 777; 403/2; 411/42, 45–48; 188/376
See application file for complete search history.

(56) References Cited

U.S. PATENT DOCUMENTS

| | | | | |
|---|---|---|---|---|
| 3,373,629 A | * | 3/1968 | Wight et al. | 74/492 |
| 3,424,263 A | * | 1/1969 | Black | 280/777 |
| 3,457,800 A | * | 7/1969 | Suda et al. | 74/492 |
| 3,600,971 A | * | 8/1971 | Scarvelis et al. | 74/492 |
| 3,851,542 A | * | 12/1974 | Adams et al. | 74/492 |
| 3,864,988 A | * | 2/1975 | Adams, III | 74/492 |
| 3,899,937 A | * | 8/1975 | Nagazumi | 74/492 |
| 4,627,306 A | * | 12/1986 | Berenjian | 74/492 |
| 5,163,795 A | * | 11/1992 | Benoit et al. | 411/45 |
| 5,722,300 A | * | 3/1998 | Burkhard et al. | 74/493 |
| 6,149,526 A | * | 11/2000 | Boersma et al. | 464/89 |
| 6,339,970 B1 | * | 1/2002 | Blex | 74/492 |
| 2002/0001513 A1 | * | 1/2002 | Tanaka | 411/45 |
| 2007/0113701 A1 | * | 5/2007 | Streng et al. | 74/492 |

* cited by examiner

*Primary Examiner* — Thomas Diaz
(74) *Attorney, Agent, or Firm* — Cantor Colburn LLP

(57) ABSTRACT

A steering column assembly includes a first jacket defining a first bore and a second jacket defining a second bore aligned with the first bore prior to collapse of the first jacket and the second jacket. A jacket connector extends through the bores to interconnect the first jacket and the second jacket. The jacket connector includes a pre-determined shear resistance, above which the jacket connector is sheared to permit telescopic movement between the first jacket and the second jacket. Accordingly, in response to an axial load greater than the pre-determined shear resistance of the jacket connector being applied to one of the first jacket and the second jacket, the jacket connector shears, permitting the telescopic movement. The jacket connector includes a pin defining a pin bore. The pin bore defines a cross sectional area, with the pre-determined shear resistance depending upon the cross sectional area of the pin bore.

27 Claims, 6 Drawing Sheets

US 8,627,742 B2

STEERING COLUMN ASSEMBLY WITH SHEARABLE JACKET CONNECTOR

CROSS REFERENCE TO RELATED APPLICATION

This application claims the benefit of U.S. Provisional Patent Application Ser. No. 61/072,994 filed Apr. 4, 2008, the disclosure of which is hereby incorporated by reference.

BACKGROUND OF THE INVENTION

1. Field of the Invention

The subject invention generally relates to a steering column assembly, and more specifically to a collapsible steering column assembly longitudinally moveable along a longitudinal axis in response to an axial load applied thereto.

2. Description of the Prior Art

Collapsible steering column assemblies include a lower jacket telescopically engaging an upper jacket along a longitudinal axis. In response to an impact event, such as a vehicular collision in which a driver impacts a steering wheel coupled to the upper jacket, the upper jacket collapses along the longitudinal axis relative to the lower jacket. The collapsible steering column assemblies include an energy absorption device for absorbing energy during the collapse stroke. Typically, the energy absorption device includes a deformable strip of metal passed through an anvil during the collapse stroke. Accordingly, the energy absorption device dissipates energy transmitted to the upper jacket by deforming the strip of metal as is well known.

The collapsible steering column assemblies may include a pivotable adjustment for adjusting a vertical position of the steering wheel vertically about a tilt axis. The collapsible steering column assemblies may also include a telescope adjustment for adjusting a horizontal position of the steering wheel longitudinally along the longitudinal axis. However, the scope of this disclosure is limited to adjustable steering column assemblies in which the upper jacket and the lower jacket remain positionally fixed relative to each other during adjustment and normal operational use, i.e., the collapsible steering column assembly of the subject disclosure may be longitudinally and pivotably adjustable only by moving both the upper jacket and the lower jacket together as a unit.

Accordingly, the upper jacket is positionally fixed relative to the lower jacket during normal operational use, yet must be moveable along the longitudinal axis during the collapse stroke in response to the collision event. Safety and design criteria require that the upper jacket remain rigidly attached to the lower jacket until a pre-determined axial load is applied along the longitudinal axis to the upper jacket, at which time the upper jacket must release relative to the lower jacket to begin the collapse stroke.

SUMMARY OF THE INVENTION AND ADVANTAGES

The subject invention provides a steering column assembly for a vehicle. The steering column assembly comprises a first jacket extending along a longitudinal axis. The first jacket defines a first bore transverse to the longitudinal axis. A second jacket is disposed within the first jacket. The second jacket defines a second bore. The second bore is aligned with the first bore when the first jacket and the second jacket are in a pre-collapse position. The second bore is and longitudinally offset from the first bore when the first jacket and the second jacket are in a post-collapse position. A jacket connector is disposed within the first bore and the second bore, and is in engagement with the first jacket and the second jacket. The jacket connector includes a pre-determined shear resistance for shearing between the first jacket and the second jacket. The jacket connector shears in response to an axial load applied to one of the first jacket and the second jacket greater than the pre-determined shear resistance. Shearing of the jacket connector permits telescopic movement between the first jacket and the second jacket.

Accordingly, the jacket connector of the steering column assembly of the subject invention provides a cost effective mechanism for axially restraining the first jacket relative to the second jacket during normal operating conditions, i.e., pre-collapse of the steering column assembly, while permitting telescopic movement of the first jacket and the second jacket in response to an axial load applied to the steering column assembly of sufficient magnitude to shear the jacket connector.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate corresponding parts throughout the several views, a steering column assembly is shown generally at 20. The steering column assembly 20 is for a vehicle and rotatably supports a steering wheel (not shown) as is well known.

Figure 1:
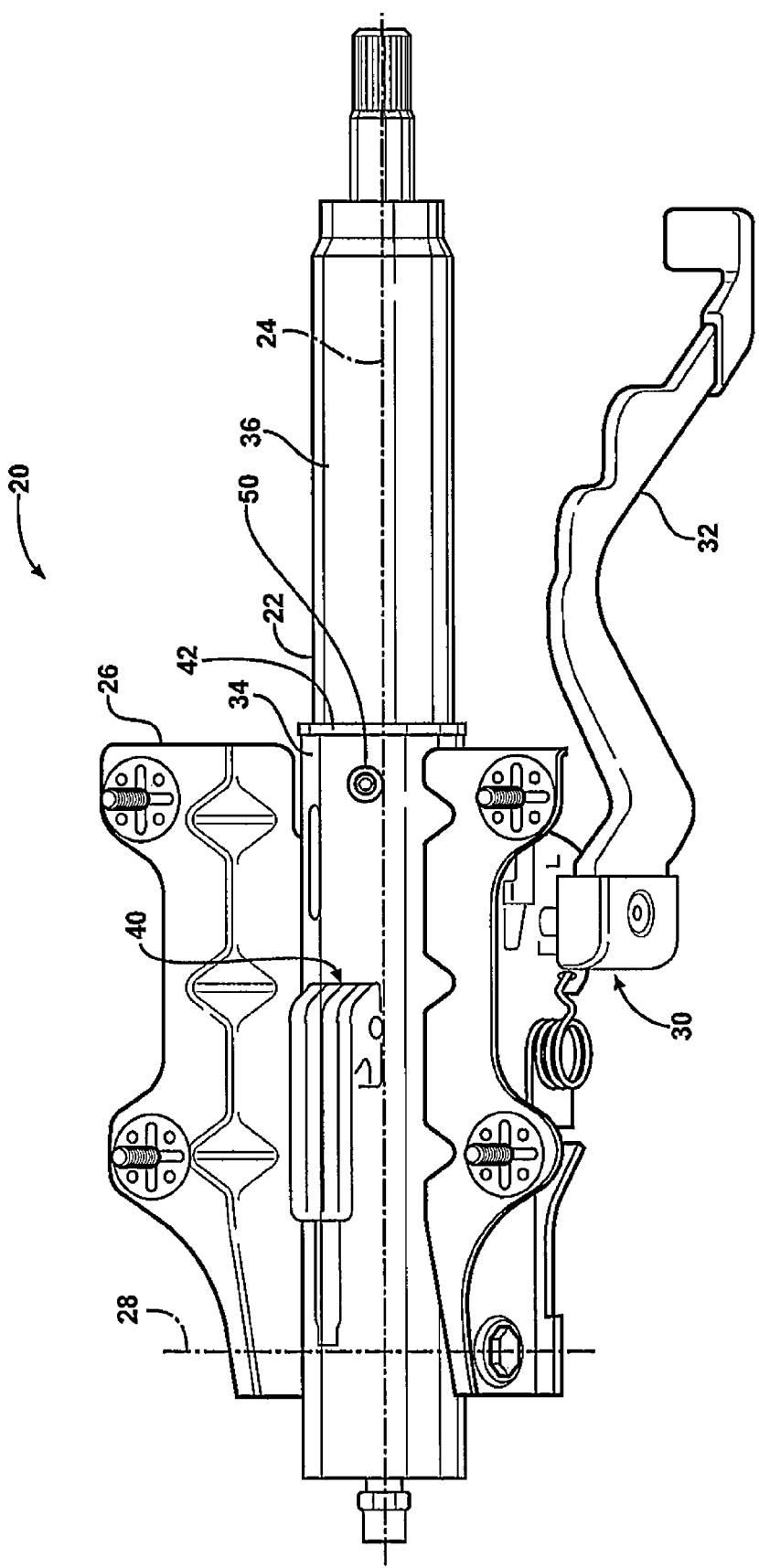
FIG. 1 is a perspective view of a steering column assembly.

Referring to FIG. 1, the steering column assembly 20 includes a column jacket 22. The column jacket 22 extends along a longitudinal axis 24. The column jacket 22 is coupled to a mounting bracket 26. The mounting bracket 26 is configured for attachment to the vehicle. The steering column assembly 20 may be pivotably adjustable about a tilt axis 28 to adjust a vertical position of the steering wheel and longitudinally adjustable along the longitudinal axis 24 to adjust a longitudinal position of the steering wheel as is well known.

A locking mechanism 30 is coupled to the mounting bracket 26. The locking mechanism 30 is moveable between a lock position and a release position. The lock position secures the column jacket 22 relative to the mounting bracket 26 to hold a desired position of the column jacket 22. The release position permits the pivotable adjustment of the column jacket 22 relative to the mounting bracket 26. The locking mechanism 30 may include any suitable device capable of securing and releasing the column jacket 22 and the mounting bracket 26 as is well known. As shown, a lever 32 is coupled to the locking mechanism 30 to operate the locking mechanism 30. However, it should be appreciated that the steering column assembly 20 may include a motor for operating the locking mechanism 30 as well. While the steering column assembly 20 is shown as being pivotably adjustable, it should be appreciated that the steering column assembly 20 need not include the pivotable adjustment as described above.

Figure 2:
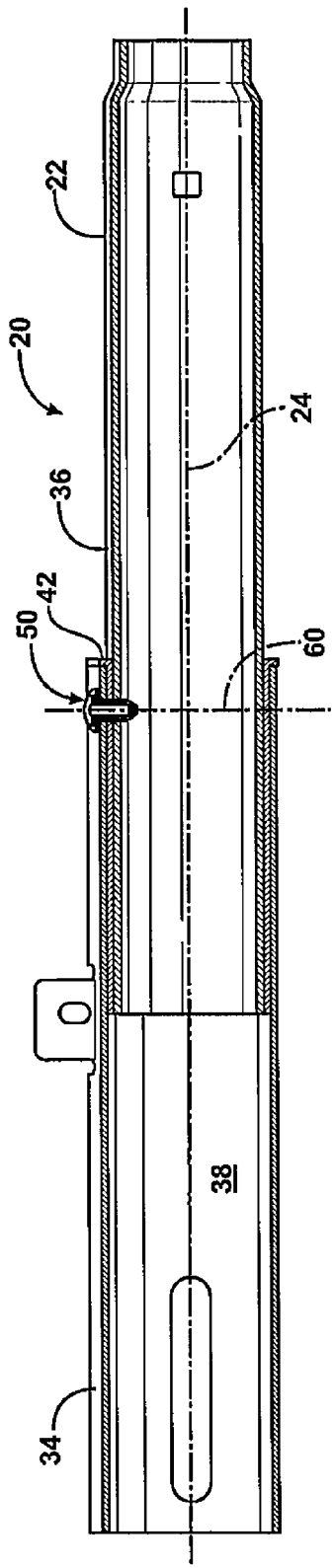
FIG. 2 is a cross sectional view along the longitudinal axis of a column jacket prior to a collapse stroke.
Figure 3:
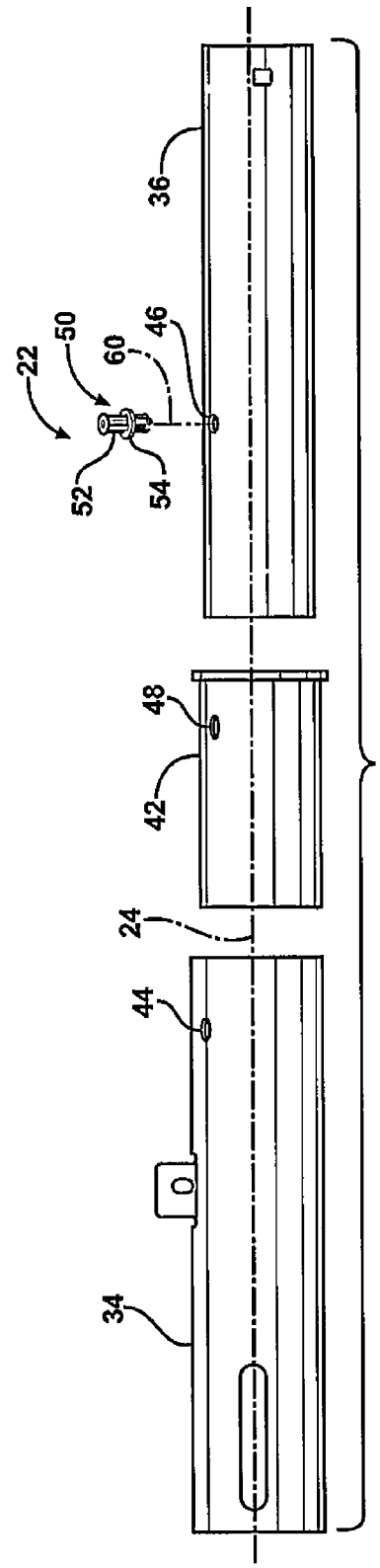
FIG. 3 is an exploded side plan view of the column jacket.

Referring also to FIGS. 2 and 3, the column jacket 22 includes a first jacket 34, i.e., a lower jacket, and a second jacket 36, i.e., an upper jacket. The first jacket 34 extends along the longitudinal axis 24 and defines an interior 38, with the second jacket 36 being telescopically disposed within the interior 38 of the first jacket 34. The second jacket 36 is longitudinally moveable along the longitudinal axis 24 relative to the first jacket 34. The second jacket 36 is moveable in response to an axial load of sufficient magnitude applied along the longitudinal axis 24 to one of the first jacket 34 and the second jacket 36. Typically, the axial load is applied during a vehicular collision in response to a driver of the vehicle impacting the steering wheel, and thereby imparting the axial load to the second jacket 36. If the axial load is above a pre-determined force, then the second jacket 36 releases relative to the first jacket 34 and moves along a collapse stroke relative to the first jacket 34. While the steering column assembly 20 may be longitudinally adjustable, the scope of the subject disclosure requires that the relative positions of the first jacket 34 and the second jacket 36 remain fixed during normal operational use, i.e., any longitudinal adjustment is achieved by moving both the first jacket 34 and the second jacket 36 together as a unit.

The steering column assembly 20 includes an energy absorption device 40. The energy absorption device 40 is coupled to both the first jacket 34 and the second jacket 36. The energy absorption device 40 absorbs energy from the axial load applied to one of the first jacket 34 and the second jacket 36 as the second jacket 36 moves along the collapse stroke during the telescopic movement between the first jacket 34 and the second jacket 36, thereby dissipating the axial load to reduce injury to the driver. Such energy absorption devices 40 are well known, and the subject invention may include any suitable energy absorption device 40 customized and configured for the specific steering column assembly 20.

Figure 4:
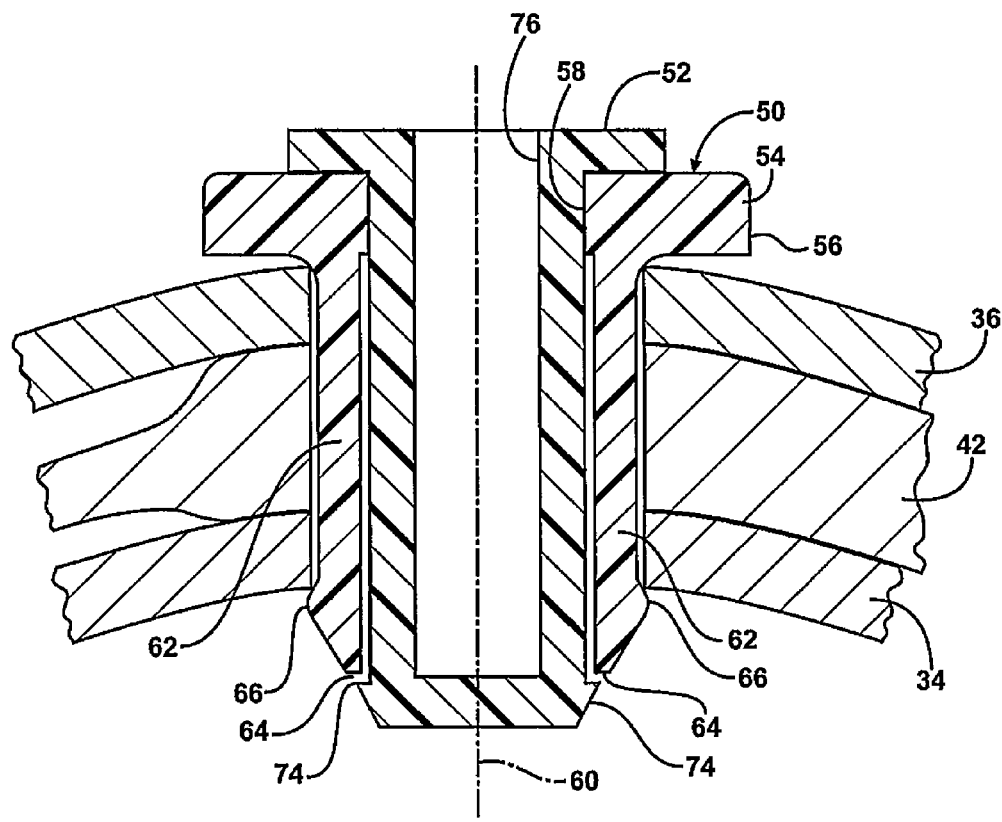
FIG. 4 is a cross sectional view of the column jacket perpendicular to a longitudinal axis.
Figure 5:
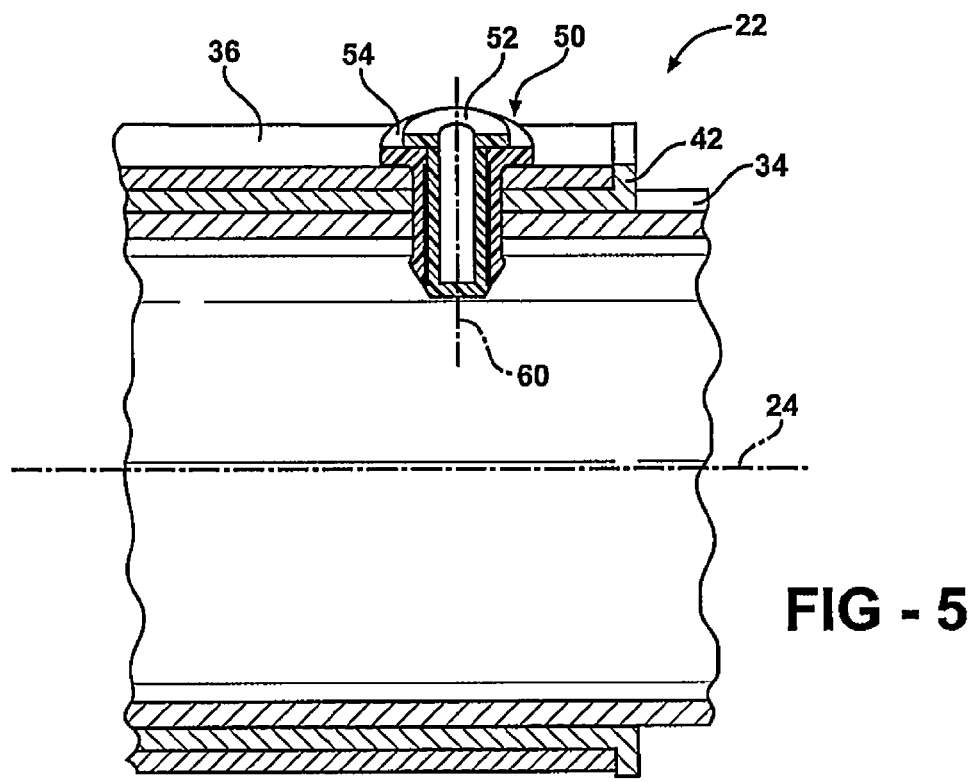
FIG. 5 is an enlarged fragmentary cross sectional view along the longitudinal axis of the column jacket prior to telescopic movement of the column jacket.
Figure 6:
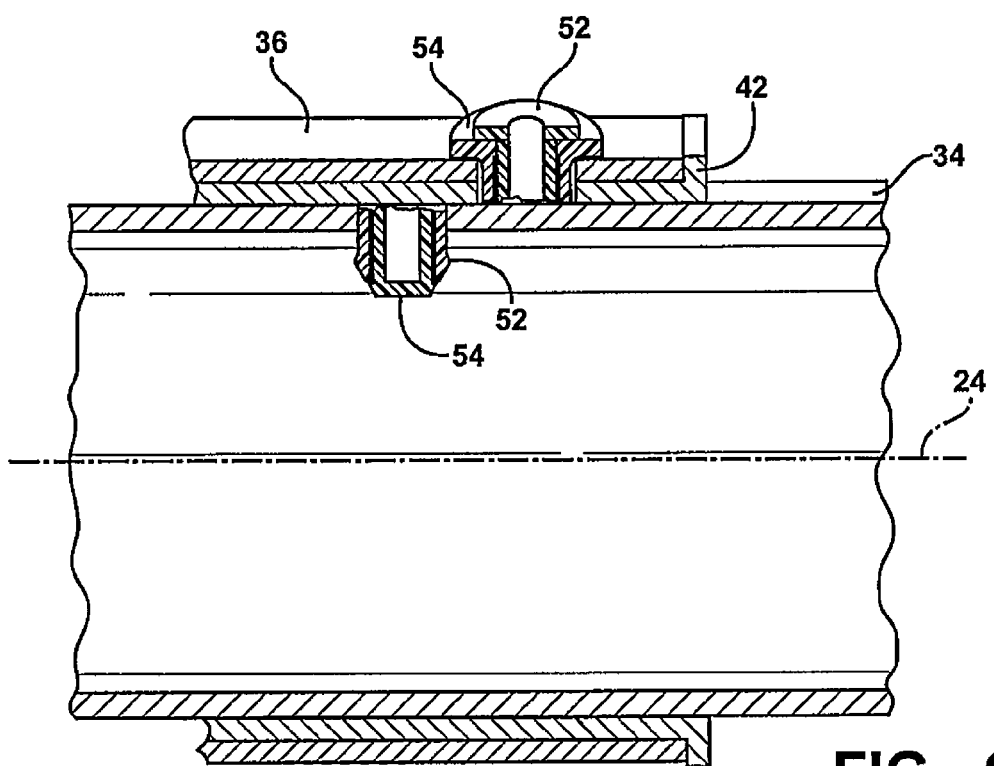
FIG. 6 is an enlarged fragmentary cross sectional view along the longitudinal axis of the column jacket subsequent to the telescopic movement.
Figure 7:
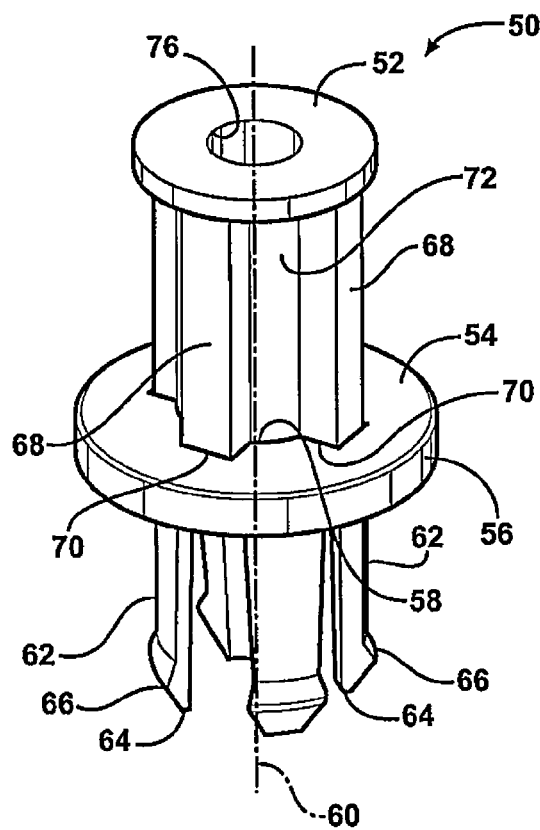
FIG. 7 is a perspective view of a jacket connector of the steering column assembly in a pre-installation state.

Referring to FIGS. 3 and 4, a bushing 42 is radially disposed between the first jacket 34 and the second jacket 36. The bushing 42 de-lashes the connection between the first jacket 34 and the second jacket 36. The bushing 42 is coupled to one of the first jacket 34 and the second jacket 36 and moveable therewith during the telescopic movement, with the other of the first jacket 34 and the second jacket 36 longitudinally moveable relative to the bushing 42 during the telescopic movement of the collapse stroke. Typically, the bushing 42 is injection molded into place between the first jacket 34 and the second jacket 36, and includes a lug in interlocking engagement with one of the first jacket 34 and the second jacket 36 to maintain relative placement of the bushing 42 relative thereto. However, it should be appreciated that the bushing 42 may be manufactured by a method other than in place injection molding.

As best shown in FIG. 3, the first jacket 34 defines a first bore 44 transverse to the longitudinal axis 24. The second jacket 36 defines a second bore 46 and the bushing 42 defines a third bore 48. The second bore 46 and the third bore 48 are aligned with the first bore 44 when the first jacket 34 and the second jacket 36 are in a pre-collapse position, i.e., a normal operating condition. The second bore 46, and perhaps but not necessarily the third bore 48, are longitudinally offset along the longitudinal axis 24 from the first bore 44 when the first jacket 34 and the second jacket 36 are in a post collapse position, i.e., after the telescopic movement between the first jacket 34 and the second jacket 36.

Referring to FIGS. 2 through 4, the first jacket 34 and the second jacket 36 are coupled together by a jacket connector 50. The jacket connector 50 interconnects the first jacket 34 and the second jacket 36. The jacket connector 50 is snugly disposed within the first bore 44, the second bore 46 and the third bore 48 in a tight, press fit engagement between the first jacket 34 and the second jacket 36. In other words, the jacket connector 50 extends through the first bore 44 of the first jacket 34, the second bore 46 of the second jacket 36 and the third bore 48 of the bushing 42. Accordingly, during normal operating conditions, the jacket connector 50 rigidly attaches the first jacket 34 to the second jacket 36, and maintains the relative position of the first jacket 34 relative to the second jacket 36.

Figure 8:
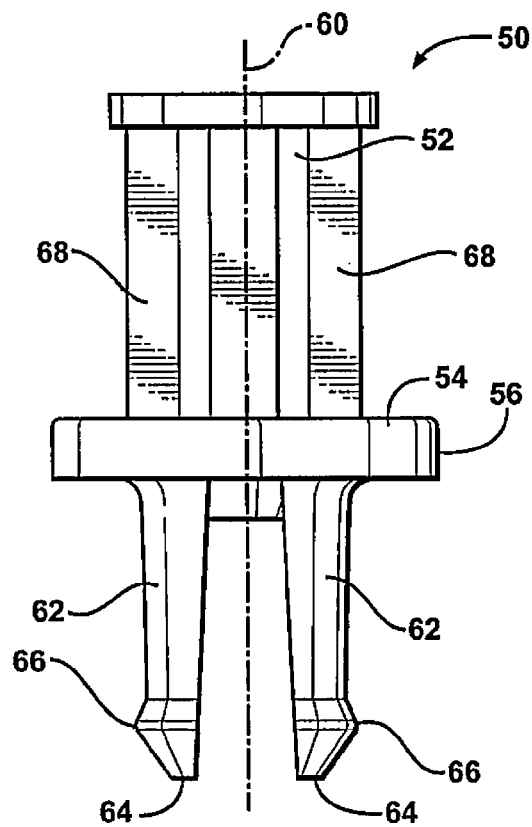
FIG. 8 is a side plan view of the jacket connector in the pre-installation state.
Figure 9:
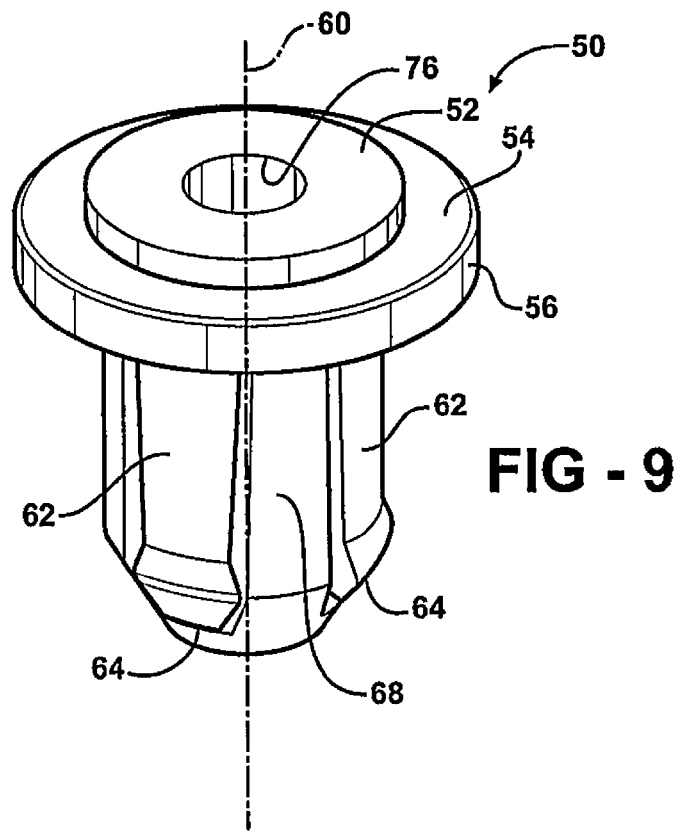
FIG. 9 is a perspective view of the jacket connector in a post-installation state.
Figure 10:
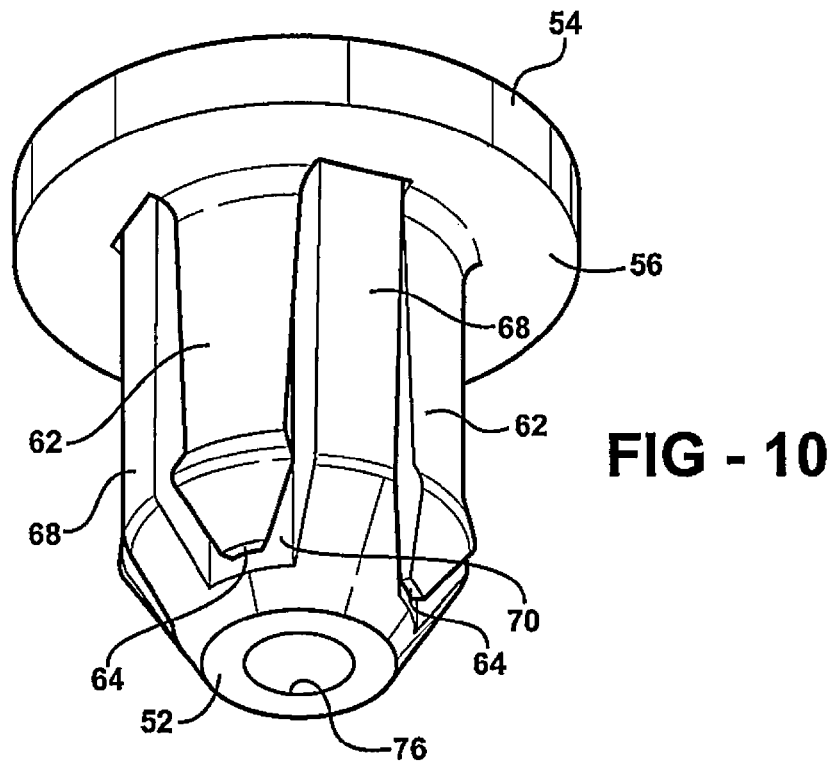
FIG. 10 is a lower perspective view of the jacket connector in the post-installation state.

The jacket connector 50 is designed to include a pre-determined shear resistance, i.e., the jacket connector 50 will shear in response to a shear load applied to one of the first jacket 34 and the second jacket 36 greater than the pre-determined shear resistance. Shearing of the jacket connector 50 permits the telescopic movement between the first jacket 34 and the second jacket 36 and begins the collapse stroke. Referring to FIG. 8, the jacket connector 50 shears at the interface between the bushing 42 and one of the first jacket 34 and the second jacket 36 in response to the axial load applied to the steering column assembly 20 being greater in magnitude than the predetermined shear resistance of the jacket connector 50.

Referring to FIGS. 7 through 10, the jacket connector 50 includes a pin 52 and a retainer 54. Preferably, the retainer 54 is manufactured from an unfilled nylon or acetal. However, it should be appreciated that the retainer 54 may be manufactured from some other material. Preferably, the pin 52 is manufactured from a glass-filled nylon. However, it should be appreciated that the pin 52 may be manufactured from some other material.

To install the jacket connector 50, the retainer 54 is positioned in and extends through the first bore 44 and the second bore 46, after which the pin 52 is press fit into the retainer 54 to urge the retainer 54 into interlocking engagement with the first jacket 34 and the second jacket 36. Accordingly, after insertion of the pin 52 into the retainer 54, the retainer 54 extends through the first bore 44 and the second bore 46 in interlocking engagement with the first jacket 34 and the second jacket 36. It should be appreciated that both the retainer 54 and the pin 52 shear in response to the axial load being applied to permit the telescopic movement.

The retainer 54 includes a base portion 56. The base portion 56 is disposed adjacent and abuts an outer surface of one of the first jacket 34 and the second jacket 36. The base portion 56 includes a diameter $D_R$ greater than a diameter $D_B$ of the first bore 44 and the second bore 46 to ensure the base portion 56 is incapable of passing through the first bore 44 and the second bore 46. The base portion 56 defines a central aperture 58 extending along a connector axis 60, through which the pin 52 is inserted. Accordingly, the pin 52 is disposed within the central aperture 58 in press fit engagement with the retainer 54.

The retainer 54 includes a plurality of arms 62 extending from the base portion 56. The arms 62 extend from the base portion 56 to a distal end 64, and are generally disposed within the first bore 44 and the second bore 46. The distal end 64 of each of the arms 62 includes a lip 66. The lip 66 on each of the arms 62 engages an inner surface of one of the first jacket 34 and the second jacket 36 in interlocking engagement. The lips 66 cooperate with the pin 52 to prevent the retainer 54 from being removed once installed in the first bore 44 and the second bore 46. The pin 52 prevents flexing of the plurality of arms 62 inward toward the connector axis 60 to prevent removal of the retainer 54 from the first bore 44 and the second bore 46, i.e., once the pin 52 is installed within the retainer 54, the pin 52 prevents the lip 66 on each of the arms 62 from disengaging from one of the first jacket 34 and the second jacket 36.

The pin 52 and the central aperture 58 include an interlocking shape to prevent relative rotation. As such, the pin 52 is rotationally fixed relative to the retainer 54 about the connector axis 60. The central aperture 58 includes a cross sectional shape perpendicular to the connector axis 60 that defines a plurality of wings 68 extending outward from the connector axis 60. The pin 52 includes a cross sectional shape perpendicular to the connector axis 60 that defines a plurality of legs 70 extending from a central core 72 radially outward from the connector axis 60. The cross sectional shape of the pin 52 is complimentary to the cross sectional shape of the central aperture 58, such that each of the plurality of legs 70 is disposed within one of the plurality of wings 68 to prevent rotation between the pin 52 and the retainer 54. Additionally, the legs 70 of the pin 52 are disposed between the arms 62 of the retainer 54.

The pin 52 extends from a first end to a distal end. The distal end of the pin 52 is disposed adjacent the distal end 64 of the arms 62 of the retainer 54. The pin 52 and the retainer 54 include a detent 74 for engaging the retainer 54 to mechanically interlock the pin 52 and the retainer 54 once the pin 52 is inserted through the central aperture 58, thereby preventing removal of the pin 52 from the central aperture 58. Preferably, the detent 74 engages at least one of the plurality of arms 62 adjacent the distal end 64 of the plurality of arms 62. Accordingly, once the jacket connector 50 is installed, the pin 52 is not removable from the retainer 54, and the retainer 54 is not removable from the column jacket 22.

The pin 52 defines a pin bore 76 extending along a longitudinal length of the pin 52. The pin bore 76 includes a cross sectional shape having a cross sectional area perpendicular to the connector axis 60. The shear resistance provided by the jacket connector 50 is dependent upon the cross sectional area of the pin bore 76. The pin bore 76 is disposed within the pin 52 to customize the shear resistance of the jacket connector 50. By increasing a diameter of the pin bore 76, the cross sectional area of the pin bore 76 is increased, which reduces the cross sectional area of the pin 52 and thereby the shear resistance of the jacket connector 50. By decreasing the diameter of the pin bore 76, the cross sectional area of the pin 52 is decreased, which increases the cross sectional area of the pin 52 and thereby the shear resistance of the jacket connector 50. Accordingly, the jacket connector 50 is customizable within a pre-determined range to vary the pre-determined shear resistance of the jacket connector 50.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A steering column assembly for a vehicle, said assembly comprising:
   a first jacket extending along a longitudinal axis and defining a first bore transverse to said longitudinal axis;
   a second jacket disposed within said first jacket and defining a second bore aligned with said first bore when said first jacket and said second jacket are in a pre-collapse position and longitudinally offset from said first bore when said first jacket and said second jacket are in a post-collapse position;
   a bushing disposed between said first jacket and said second jacket, said bushing defining a third bore aligned with said first bore and said second bore when said first jacket and said second jacket are in said pre-collapse position; and
   a jacket connector extending through said first bore, said second bore, and said third bore and in engagement with said first jacket, said second jacket, and said bushing and including a pre-determined shear resistance for shearing at an interface between said bushing and one of said first jacket and said second jacket in response to an axial load applied to one of said first jacket and said second jacket greater than said predetermined shear resistance to permit telescopic movement between said first jacket and said second jacket;
   wherein said jacket connector includes a pin extending through said first bore and said second bore;
   wherein said pin defines a pin bore extending along the length of the pin and defining a cross sectional shape having a cross sectional area perpendicular to a connector axis; and
   wherein said predetermined shear resistance is dependent upon the cross sectional area of said pin bore.

2. An assembly as set forth in claim 1 wherein said jacket connector includes a retainer extending through said first bore and said second bore.

3. An assembly as set forth in claim 2, wherein a cross sectional shape of the pin is complementary to a cross sectional shape of the retainer so as to prevent rotation of the pin relative to the retainer.

4. An assembly as set forth in claim 2 wherein said retainer includes a base portion abutting an outer surface of said first jacket and defining a central aperture extending along said connector axis.

5. An assembly as set forth in claim 4 wherein said pin is disposed within said central aperture in press fit engagement with said retainer to urge said retainer into interlocking engagement with said first jacket and said second jacket such that both said retainer and said pin shear in response to the axial load being applied to permit said telescopic movement.

6. An assembly as set forth in claim 4, wherein said central aperture includes a cross sectional shape that defines a plurality of wings extending outward from the connector axis.

7. An assembly as set forth in claim 6, wherein said pin includes a cross sectional shape that defines a plurality of legs extending outward from the connector axis.

8. An assembly as set forth in claim 7, wherein said cross sectional shape of said plurality of legs is complementary to said cross sectional shape of said plurality of wings such that each of the plurality of legs is disposed within one of the plurality of wings so as to prevent rotation of the pin relative to the retainer.

9. An assembly as set forth in claim 4 wherein said first bore and said second bore define a diameter and said base portion includes a diameter greater than said diameter of said first bore and said second bore.

10. An assembly as set forth in claim 5 wherein said retainer includes a plurality of arms extending from said base portion to a distal end.

11. An assembly as set forth in claim 10 wherein each of said plurality of arms include a lip disposed at said distal end for engaging an inner surface of said second jacket in interlocking engagement wherein said pin prevents flexing of said plurality of arms inward toward said connector axis to prevent removal of said retainer from said first bore and said second bore.

12. An assembly as set forth in claim 10, wherein said retainer includes at least three arms extending from said base portion to the distal end.

13. An assembly as set forth in claim 5 wherein said pin is rotationally fixed relative to said retainer about said connector axis.

14. An assembly as set forth in claim 13 wherein said central aperture includes a cross sectional shape perpendicular to said connector axis defining a plurality of wings.

15. An assembly as set forth in claim 14 wherein said pin includes a central core and a plurality of legs extending from said central core radially outward from said connector axis with each of said plurality of legs disposed within one of said plurality of wings to prevent rotation between said pin and said retainer.

16. An assembly as set forth in claim 5 wherein said pin includes a detent for engaging said retainer to prevent removal of said pin from said central bore.

17. An assembly as set forth in claim 16:
wherein said retainer includes a plurality of arms extending from said base portion to a distal end; and
wherein said detent engages at least one of said plurality of arms adjacent said distal end of said plurality of arms.

18. An assembly as set forth in claim 16:
wherein said retainer includes a plurality of arms extending from said base portion through said first bore, said second bore, and said third bore;
wherein at least one of said plurality of arms includes a lip disposed at a distal end of said at least one of said plurality of arms for engaging an inner surface of said second jacket in interlocking engagement;
wherein said pin prevents flexing of said plurality of arms inward toward said connector axis to prevent removal of said retainer from said first bore and said second bore; and
wherein said detent defines a surface disposed so as to engage said distal end of said at least one of said plurality of arms, said surface being disposed substantially perpendicular to said connector axis.

19. An assembly as set forth in claim 18 wherein said bushing is coupled to one of said first jacket and said second jacket and moveable therewith during said telescope movement.

20. An assembly as set forth in claim 1 further comprising an energy absorption device for absorbing energy during said telescope movement between said first jacket and said second jacket.

21. An assembly as set forth in claim 1 wherein said jacket connector includes a retainer extending through said first bore, said second bore, and said third bore.

22. An assembly as set forth in claim 21 wherein said retainer includes a base portion defining a central aperture extending along a connector axis and said jacket connector further includes said pin disposed within said central aperture in press fit engagement with said retainer to urge said retainer into interlocking engagement with said first jacket, said second jacket, and said bushing such that both said retainer and said pin shear in response to the axial load being applied to permit said telescopic movement.

23. An assembly as set forth in claim 1, wherein said pin bore is disposed about the connector axis.

24. An assembly as set forth in claim 23, wherein said pin bore is disposed uniformly along the length of the connector axis.

25. An assembly as set forth in claim 24, wherein said pin bore is disposed uniformly along the entire length of the connector axis.

26. An assembly as set forth in claim 23, wherein said pin bore is disposed uniformly about the connector axis.

27. An assembly as set forth in claim 23, wherein a cross sectional shape of said pin bore is circular.

* * * * *